Jan. 19, 1954

P. BOONE 2,666,361

VARIABLE LIGHT-MODIFYING DEVICE FOR PHASE CONTRAST

Filed July 27, 1949

INVENTOR
PHILIP BOONE
BY
Louis L. Gagnon
Noble S. Williams
ATTORNEYS

Patented Jan. 19, 1954

2,666,361

UNITED STATES PATENT OFFICE 2,666,361

VARIABLE LIGHT-MODIFYING DEVICE FOR PHASE CONTRAST

Philip Boone, Winchester, Mass., assignor to American Optical Company, Southbridge, Mass., a voluntary association of Massachusetts Application July 27, 1949, Serial No. 107,014

6 Claims. (Cl. 88—39)

This invention relates to optical devices and systems for obtaining gradual alteration of contrast effects in images of objects. More particularly, the invention relates to such devices and systems when incorporated with a microscope, for viewing structural differences in specimens which are not clearly perceptible through usual methods of microscopy.

An object or specimen of a type considered herein may be regarded as constituting a plurality of particles and surrounding regions, a given particle and the adjacent surround presenting, for example, a small difference of optical path (thickness times refractive index) or a small transmission difference, or both. For clarity of explanation, a single particle and its surround and the relation and control of light rays directed upon and emanating therefrom will be considered.

Known methods of what is commonly termed "phase microscopy" involve the study of objects wherein optical path and/or transmission differences are present. Said objects, when illuminated, produce deviated and undeviated light rays, through the phenomenon of diffraction, having phase and/or amplitude differences therebetween. Retardation and absorption components are introduced in the optical system for modifying these differences to provide desired contrast effects in an image of the object. These methods customarily employ a diaphragm adjacent the entrance pupil of an optical system for admitting a bundle of light rays of a given transverse contour to a condenser. The latter directs the light upon an object or specimen and an objective and eyepiece are employed in a generally conventional manner. At the back focal plane of the objective, or, otherwise stated, at the exit pupil of the system formed by the condenser and objective, a special light-modifying device is positioned for altering the phase and/or amplitude differences which exist between deviated (diffracted) and undeviated light rays emanating from the specimen. These differences are due, respectively, to the aforesaid optical path and transmission differences in the specimen. Some of the light rays incident the particle are deviated, for example, by a discontinuity of optical path at the edges of the particle and may be retarded in phase so as to constitute higher orders of spectra. Other light rays incident the particle emerge as undeviated rays and constitute the zero order. Light rays emanating from the surround may also be considered as substantially undeviated rays for purposes of the method. The undeviated rays emerging from the particle and surround are spread throughout a visible image plane such as the field of an eyepiece. The deviated rays or spectra are brought to a focus on a part of the eyepiece field and are combined with overlapping portions of the undeviated rays to form a geometrical image of the particle. During their transmittal by the aforesaid light-modifying element, the deviated and undeviated rays, which differ in phase and/or amplitude characteristics, as above described, are selectively intercepted and said characteristics are altered so that either reinforcing or destructive interference takes place between the rays. Thus, either bright or dark contrast of the particle with respect to the surround may be provided according to given properties of the light-modifying element.

The present invention is related to the above-described method but employs novel means for modifying the phase and amplitude differences between the deviated and undeviated rays emanating from an object so that a continuous range of contrast effects may readily be obtained in an image of the object rather than an invariable effect. Relatively simple constructions are employed for the purpose basically involving an adjustable transparent plate predeterminedly located in the system, said constructions being compact and having advantages of inexpensiveness and ease of operation.

Although a diaphragm is shown and described herein as a preferred means for admitting light to an optical system and for controlling the dimensions and contour of light, other means may be employed for a generally similar purpose. The term "light," as used herein, is not necessarily restricted to those wave lengths of radiant energy to which the human eye is sensitive but may comprise other forms of radiant energy including those in the invisible portions of the spectrum. Accordingly, any suitable primary or secondary light source may be utilized in the optical systems of the invention. The use of a diaphragm in the optical system provides a secondary light source and is thus considered as falling within the meaning of the term "light source." An adjustable diaphragm such as an iris diaphragm could also suitably be employed for varying the dimensions of the light aperture in the interests of improved imaging of an object. Other light sources which could be positioned or effectively positioned at a location similar to the diaphragm shown and which are contemplated by the invention comprise an incandescent filament, a fluorescent element, a reflecting surface, or the image of a filament, of a light aperture or of some other source of radiant energy.

An object of the invention is to provide an adjustable optical device or system which is capable of gradually altering contrast effects in the visible image of an object under observation so that its structure may be rendered more clearly apparent.

Another object of the invention is to provide such an adjustable device or system which is particularly adapted to a microscope.

A further object of the invention is to provide an adjustable device which permits a gradual alteration of the phase and/or amplitude relation between deviated and undeviated light rays emanating from an illuminated object.

Still another object of the invention is to provide a device of the character described embodying a simple and relatively inexpensive construction which may be easily adjusted for obtaining a variety of contrast effects in the image of an object.

A still further object of the invention is to provide a device of the aforesaid type which permits continuous variation of phase and/or amplitude between light rays emerging from an object principally through the instrumentality of a rotatable or tiltable transparent plate.

These and other objects of the invention will be apparent from the following description taken in connection with the accompanying drawings, wherein like reference characters refer to like parts throughout the several views of which:

Fig. 8 is a side elevation view, partly in cross-section and with parts broken away, of another form of light-modifying element of the invention suitable for use with the diaphragm of Fig. 7.

Figure 1:
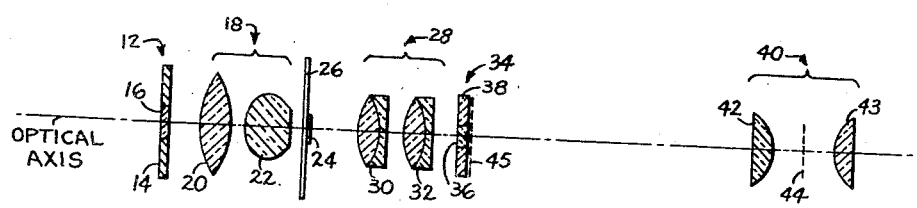
Figure 1 is a diagrammatic view of an optical system forming one embodiment of the invention.
Figure 2:
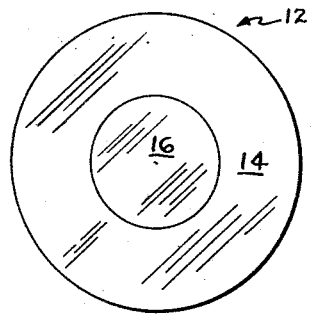
Fig. 2 is a front detail view of a diaphragm suitable for use in the optical system.

The optical system shown in Fig. 1 is of a suitable type for incorporation with a microscope. A diaphragm 12, such as that shown in Fig. 2, having an opaque portion 14 and a clear portion or light aperture 16 of predetermined dimensions and contour is positioned adjacent an entrance pupil of the system for admitting light thereto. The diaphragm serves as a secondary light source, it being understood that an incandescent or other source of light positioned to the left of the diaphragm, but not shown, is included and that lens means and/or diffusing means may be positioned between the source of light and diaphragm 12 for initially providing light of a desired quality.

A condenser 18, comprising elements 20 and 22, directs the light rays from aperture 16 upon an object or specimen 24 mounted upon a slide 26. An objective 28, comprising elements 30 and 32, is employed and an adjustable or variable light-modifying element 34 having a transparent zone 36 which is conjugate to aperture 16 of the diaphragm and a complementary transparent zone 38 is positioned adjacent the back focal plane or exit pupil of the system formed by objective 28 and condenser 18. Light from aperture 16 is normally focused upon zone 36. The adjustable features of the light-modifying element are omitted in Fig. 1, the same being shown in detail in other of the drawings. The light aperture of diaphragm 12 and the conjugate zone of light-modifying element 34 may be of some other form, such as annular, as will presently be described. Inasmuch as elements 12 and 34 coact to provide selective modification of the light rays, they may be regarded as together constituting a light-modifying device of the invention and, in conjunction with the various other elements shown or indicated, as forming an optical system of the invention. The system of Fig. 1 is completed by an eyepiece 40 comprising, for example, elements 42 and 43 and having an image plane 44. Dotted line 45 represents a plane contiguous element 34 at which various auxiliary elements, presently to be described, may be positioned.

The conjugate zone 36 and complementary zone 38 of light-modifying element 34 are formed for respectively intercepting the undeviated light rays and the deviated light rays emanating from specimen 24 and for modifying at least one of the phase and amplitude differences existing between said rays, due to structural differences in the specimen. Basically, the light-modifying element, which is merely diagrammatically represented in Fig. 1 and shown in detail in Figs. 3 through 6 and Fig. 8, comprises one or more transparent preferably plane parallel plate-like components which are rotatably or tiltably mounted so that they may be variably inclined with respect to the optical axis in a gradual manner and, accordingly, may be varied in effective thickness and perform a gradual modification of the light rays passing therethrough. Thus, a plate-like component may be formed of a glass or a plastic, or of a glass having a suitable dielectric coating, which presents a greater optical path to the incident rays as it is increasingly rotated or tilted and permits gradual modification of the phase of said rays. Or the plate-like component may be of a light-absorbing glass or a plastic, or have deposited thereon a suitable absorptive coating such as a metal whereby the absorptivity is increased with increases of rotation or tilt of the component and a gradual variation of the amplitude of incident light rays is accomplished.

Figure 3:
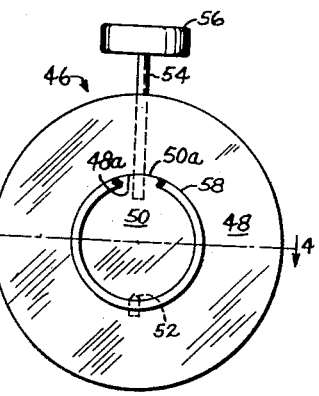
Fig. 3 is a front detail view of a light-modifying element of the invention.
Figure 4:
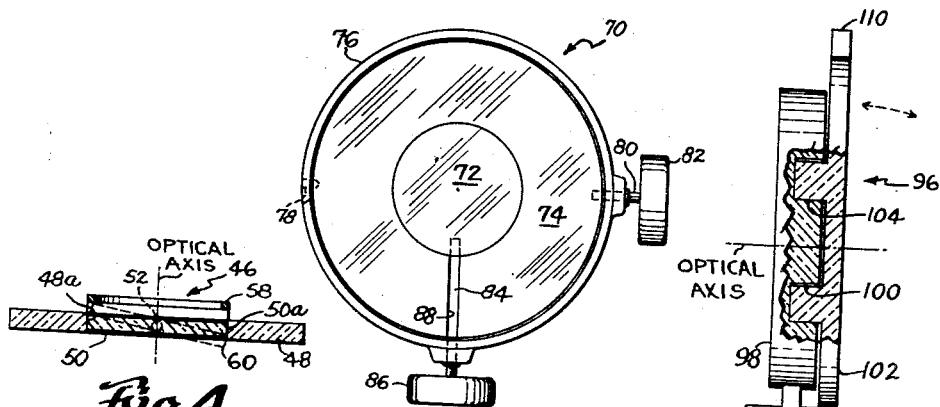
Fig. 4 is a cross-sectional view of the element of Fig. 3, taken along the line 4—4.

In Figs. 3 and 4, a light-modifying element 46 is shown. Element 46 comprises a fixed annular, transparent component 48 forming the complementary zone which may, for example, be composed of glass or other material of a given refractive index and a rotatable circular transparent component 50 forming the conjugate area or zone composed, for example, of a similar glass or other material. The thickness of said components as well as that of other components and coatings shown herein is greatly exaggerated for clarity of illustration only. For a similar purpose, the degree of rotation or tilt of components is also exaggerated. Component 50 is mounted for rotation by a pivot pin 52 and a shaft 54, the latter extending radially through component 48 so as to rotate therewithin and being attached to component 50. A knob 56 is provided for rotating the component 50. A light-shielding opaque ring 58 is mounted upon component 48 so as to block any light rays which might pass between the aperture wall 48a of component 48 and the periphery 50a of component 50 when the latter is rotated to a position such as that indicated by the dotted line 60 shown in Fig. 4. Alternatively, ring 48 could be dispensed with and a close mating of surfaces 48a and 50a relied upon for preventing light leakage, or a flexible light-transmitting strip formed, for example, of a rubber or plastic material could be positioned between surfaces 48a and 50a.

Considering element 46 to be positioned in the optical system of Fig. 1 at the location of element 34 thereof, rotation of knob 56 provides a rotation of the conjugate plate 50 and alters the phase of the undeviated light rays emanating from specimen 24 and incident plate 50. As hereinbefore described, alteration of the phase of either the undeviated or deviated light rays incident zones 50 and 48, respectively, may be performed to provide either reinforcing or destructive interference of the light rays forming the image of the particle and thus the particle may be represented either in bright or dark contrast with respect to the surround. Assuming, for example, that the relative thicknesses and refractive indices of the conjugate and complementary components 50 and 48 is so chosen that an initial predetermined angular position of component 50 relative to component 48 provides an equal optical path through components 50 and 48 and, accordingly, no relative retardation between the undeviated and deviated light rays, rotation of component 50 in a direction which increases its angle of inclination with respect to the plane of component 48 increases the optical path through element 50 and provides a relative retardation of the undeviated light rays and bright contrast in the visible image. Rotation of component 50 in an opposite direction so as to reduce its angle of inclination with respect to the plane of component 48 diminishes the optical path through component 50 and provides a relative acceleration of the undeviated light rays or, otherwise stated, a relative retardation of the deviated light rays and dark contrast in the visible image. A satisfactory range of retardation properties of component 50 at different angles of inclination may extend, for example, from zero to plus or minus .5λ. This range may be increased or decreased as desired.

While the conjugate and complementary components may appropriately be formed of similar material as, for example, glass of a given refractive index it may be desirable to provide one component of a different refractive index than another as, for example, a higher refractive index of the thinner rotatable component so that a very slight angular inclination of the rotatable or tiltable component provides zero relative retardation and the maximum inclination departs only slightly from a plane intersecting the optical axis at 90°. An example of such a construction is shown in element 62 of Fig. 5 which comprises complementary fixed component 64 and rotatable conjugate component 66. A light-retarding material or layer 68 is deposited upon component 66. This layer may suitably be composed of a dielectric substance such as magnesium fluoride or quartz formed by an evaporation process. The entire range of angular displacement of component 66 may be considered as lying within the transverse dimension of component 64. It will be noted that no light sealing ring as shown in Fig. 5, a close contact of surfaces 64a and 66a obviating the need thereof.

In all of the examples shown herein, it is to be understood that zero relative retardation may also be provided when the rotatable or tiltable component is at a position parallel with the fixed component in which instance a plus retardation of the light rays incident said rotatable or tiltable component would be produced by tilting the same. It is also to be understood that, alternatively, the conjugate component may be fixedly mounted and the complementary component rotated or tilted in any of the examples through simple modification of the mounting means as suggested in Fig. 6.

Figure 6:
Fig. 6 is a front detail view of another form of light-modifying element of the invention.
Figure 5:
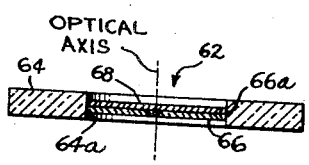
Fig. 5 is a cross-sectional view of a modification of the element of Fig. 4.

The light-modifying element 70 illustrated in Fig. 6 may be regarded as incorporating both rotatable conjugate and complementary components 72 and 74, respectively, or, alternatively, as an element wherein one of the components is held fixed and the other is rotatable, said last-named construction being generally similar in operation to the examples of Figs. 3, 4, and 5, above described. Considering the first-named form, component 74 is mounted for rotation in a carrying tube 76 by a pivot pin 78 and a shaft 80, fixedly attached to component 74 and rotatably mounted within tube 76. Rotation of the component is obtained by a knob 82. Component 72 is rotated by shaft 84, fixedly attached thereto and rotatably mounted in carrying tube 76, said shaft having an actuating knob 86. A slot 88 formed in component 74 permits positioning of shaft 84 radially within said component while permitting rotation of the latter. Alternatively shafts 80 and 84 could be positioned coaxially so that both components would rotate about a single axis. Assuming the zero retardation position to exist when both components are parallel, element 70 would provide alternate means for enabling a reduced movement of the components to obtain plus and minus phase alteration. For example, a slight inclination of component 72 would provide a retardation of the undeviated light rays. Return of component 72 to the zero position and a slight inclination of component 74 would produce a retardation of the undeviated light rays. As will be apparent, an interlocking mechanism could be provided between the actuating means so that one component moves toward the zero position while the other is departing therefrom.

Figure 7:
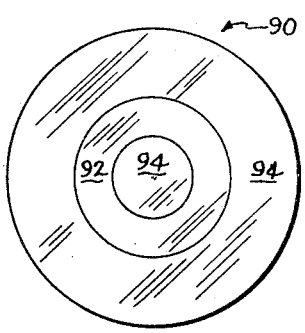
Fig. 7 is a front detail view of an alternative form of diaphragm of the invention.

In Fig. 7, a diaphragm 90 is shown having an annular clear portion or light aperture 92 and opaque portions 94. Diaphragm 90 may be positioned in the optical system of Fig. 1 at the location occupied by diaphragm 12 where an annular bundle of light rays is preferred. A variable light-modifying element 96 of the type shown in Fig. 8 may appropriately be employed with diaphragm 90, said element 96 being positioned in the system of Fig. 1 at the location of element 34. Element 96 comprises a fixed complementary component 98 having a recessed or female annular portion 100 formed therein and a tiltable component 102 having annular protruding conjugate portions 104 formed thereon. Component 102 is pivotally attached to fixed portions 106 of a carrying tube by a pivot pin or shaft 108. Tilting of component 102 may be obtained by actuating extension 110 or by a suitable mechanism, not shown. Light from annular aperture 92 of the diaphragm 90 is normally focused upon annular portions 100 and 104 of element 96. Tilting of component 102 may be employed to vary the optical path within annular portions 104 and provides zero retardation and plus or minus retardation of the undeviated light rays at various inclination positions in the manner already described relative to the preceding examples. Employment of a rotatable component (Figs. 3–6) permits a smaller departure of said component from a given plane than a tiltable component which is pivoted at an extremity (Fig. 8). However, certain constructional advantages accrue to each form as will readily be evident.

The foregoing devices may also be employed to gradually vary the amplitude ratios between the deviated and undeviated light rays. Thus, for example, component 50 of Figs. 3 and 4 could be formed of a light absorbing glass the density of which would be varied according to various thicknesses thereof obtained by rotating said component. In Fig. 6, component 72 could be of a phase altering type and component 74 could be of an amplitude modifying type. In other modifications, the rotatable or tiltable component could be of a composite phase and amplitude modifying form as, for example, obtained by superposed bonded portions of each form, and in still further modifications the rotatable component could be of one type while the fixed component provides a constant thickness of material of the other type.

The various elements and devices shown herein are to be construed as functioning most effectively in parallel light to avoid obliquity effects in the visible image. Thus, it may be considered desirable to incorporate infinity corrected objectives in the optical system or to provide a system similar to an anastigmatizing lens system of a type employed in a petrographic microscope. The constructions of such lenses are well known and are therefore deemed unnecessary of inclusion herein. It is to be understood that light retarding coatings of the type described relative to Fig. 5 or light absorbing coatings such as a deposition of aluminum or Inconel, may be formed upon fixed components of the device, as upon component 48 of Fig. 3. Said coatings would be of constant thickness and would provide various other relative retardation and absorption properties of the conjugate and complementary zonal portions.

Where the source of light is other than monochromatic as, for example, where "white" light is utilized, an achromatization plate consisting of plane parallel individual conjugate and complementary portions of different thickness and/or dispersion for selectively modifying the phase of light of predetermined wave length may be positioned at plane 45 of Fig. 1. Such a plate would insure that the path difference between the undeviated and deviated light rays is substantially constant for all wave lengths. Similarly formed phase modifying plates capable of introducing color in the visible image could also be positioned at plane 45 for obtaining a relatively bright region of a specimen in a given color and, simultaneously, a relatively dark region in a contrasting color. In certain cases, it may also be desirable to provide a system with enhanced chromatic variation. Alternatively, it would be possible to provide conjugate and complementary portions of the light-modifying device itself wherein differences of thickness and dispersion between said portions were employed for the above-mentioned purposes of achromatization and introduction of color in the image.

It will be apparent that other modifications of the elements, devices and optical systems above-described may be made in accordance with the general principles exemplified herein. Accordingly, such examples as have been generally presented are merely illustrative and the invention may be otherwise embodied and practiced within the scope of the following claims.

I claim:

1. An optical system for producing uninterrupted progressively variable contrast effects in an image of an object of relatively low contrast and of the type producing deviated and undeviated light rays, said system comprising means providing a light source of predetermined dimensions and contour adjacent an entrance pupil of said system, condenser and objective means optically aligned with said light source and coacting to provide an image of said light source at an image plane adjacent the exit pupil of said condenser and objective, and light-modifying means positioned adjacent said image plane and having a plurality of interfitting elements providing transparent zonal areas for selectively intercepting said deviated and undeviated light rays emanating from the object when positioned at a predetermined object plane in front of said objective, one area of said zonal areas being substantially geometrically similar in shape to the contour of said light source and of such a size and so located as to substantially coincide with the image of said light source produced at said image plane, one of said elements being a transparent member having front and back substantially parallel surface portions and being angularly adjustable relative to another of said elements and with respect to the optical axis of said system for gradually modifying, in an uninterrupted manner, at least one of the phase and amplitude characteristics of the light rays transmitted thereby, opaque means positioned adjacent the interface areas formed between said relatively movable elements and supported by at least one of said elements so as to intercept the light rays directed toward said interface areas, and means for angularly adjusting said adjustable element to thereby alter the phase and amplitude relationship existing between said deviated and undeviated light rays at the image plane of said objective.

2. An optical system for producing uninterrupted progressively variable contrast effects in an image of an object of relatively low contrast and of the type producing deviated and undeviated light rays, said system comprising means providing a light source of predetermined dimensions and contour adjacent an entrance pupil of said system, condenser and objective means optically aligned with said light source and coacting to provide an image of said light source at an image plane adjacent the exit pupil of said condenser and objective, light modifying means positioned adjacent said image plane and comprising a plurality of transparent plane-parallel concentric portions of predetermined relative thickness and refractive index for selectively intercepting said deviated and undeviated light rays emanating from the object when positioned at a predetermined object plane in front of said objective, one of said concentric portions being substantially geometrically similar in shape to the contour of said light source and of such a size and so located as to substantially coincide with the image of said light source produced at said image plane, at least one of said concentric portions being movable, and means for pivotally mounting said movable concentric portion relative to another of said concentric portions and angularly with respect to the optical axis of said system so as to gradually vary the effective optical thickness of the movable portion relative to light rays directed therethrough, thereby gradually modifying, in an uninterrupted manner, at least one of the phase and amplitude characteristics of the light rays transmitted thereby relative to at least one of the phase and amplitude characteristics of the light rays transmitted by another of said concentric portions for altering contrast effects in an image of said object at the image plane of said objective.

3. An optical system for producing uninterrupted progressively variable contrast effects in an image of an object of relatively low contrast and of the type producing deviated and undeviated light rays, said system comprising means providing a light source of predetermined dimensions and contour adjacent an entrance pupil of said system, condenser and objective means optically aligned with said light source and coacting to provide an image of said light source at an image plane adjacent the exit pupil of said condenser and objective, light modifying means positioned adjacent said image plane and comprising a pair of transparent plane-parallel concentric portions of predetermined relative thickness and refractive index for selectively intercepting said deviated and undeviated light rays emanating from the object when positioned at a predetermined object plane in front of said objective, one of said concentric portions being substantially geometrically similar in shape to the contour of said light source and of such a size and so located as to substantially coincide with the image of said light source produced at said image plane, and means for pivotally mounting each of said concentric portions for movement relative to each other and angularly with respect to the optical axis of said system so as to gradually vary the effective optical thickness of either movable portion relative to the light rays directed therethrough, thereby gradually modifying, in an uninterrupted manner, at least one of the phase and amplitude characteristics of the light rays transmitted by one concentric portion relative to at least one of the phase and amplitude characteristics of the light rays transmitted by the other of said concentric portions for altering contrast effects in an image of said object at the image plane of said objective.

4. An optical system for producing uninterrupted progressively variable contrast effects in an image of an object of relatively low contrast and of the type producing deviated and undeviated light rays, said system comprising means providing a light source of predetermined dimensions and contour adjacent an entrance pupil of said system, condenser and objective means optically aligned with said light source and coacting to provide an image of said light source at an image plane adjacent the exit pupil of said condenser and objective, light modifying means positioned adjacent said image plane and comprising a plurality of transparent plane-parallel concentric portions of predetermined relative thickness and refractive index for selectively intercepting said deviated and undeviated light rays emanating from the object when positioned at a predetermined object plane in front of said objective, one of said concentric portions being substantially geometrically similar in shape to the contour of said light source and of such a size and so located as to substantially coincide with the image of said light source produced at said image plane, at least one of said concentric portions being movable, means for pivotally mounting said movable concentric portion relative to another of said concentric portions and angularly with respect to the optical axis of said system so as to gradually vary the effective optical thickness of the movable portion relative to light rays directed therethrough, and opaque means positioned adjacent said portions in a manner so as to intercept any light rays passing between said concentric portions, thereby gradually modifying, in an uninterrupted manner, at least one of the phase and amplitude characteristics of the light rays transmitted thereby relative to at least one of the phase and amplitude characteristics of the light rays transmitted by another of said concentric portions and thereby alter the phase and amplitude relationship existing between the deviated and undeviated light rays at the image plane of said objective.

5. An optical system for producing uninterrupted progressively variable phase contrast effects in an image of an object of relatively low contrast and of the type producing deviated and undeviated light rays, said system comprising means providing a light source of predetermined dimensions and contour adjacent an entrance pupil of said system, a condenser and an objective optically aligned with said light source and coacting to provide an image of said light source at an image plane adjacent the exit pupil of said condenser and objective combined, and light-modifying means positioned adjacent said image plane and comprising a plurality of individual transparent optical elements, said transparent optical elements respectively having interfitting portions, said optical elements having substantially parallel front and back surface portions spaced predetermined distances apart and jointly providing transversely disposed substantially adjacent transparent zonal areas jointly intercepting substantially all of the deviated and undeviated light rays emanating from an object when positioned at a predetermined object plane of said objective and illuminated by said condenser, said interfitting optical elements being so controlled in optical thicknesses at said zonal areas and so correlated to each other that one of said zonal areas will be a conjugate zonal area for modifying said undeviated light rays and another of said zonal areas will be a complementary zonal area for modifying said deviated light rays, the zonal area constituting the conjugate zonal area being substantially geometrically similar in shape to the shape of said light source image adjacent said exit pupil and of such a size and so located as to intercept substantially all of the undeviated light rays forming said light source image, one of said optical elements being angularly adjustable relative to another of said elements and with respect to the optical axis of said system to selectively alter the effective optical path at one of said conjugate and complementary zonal areas to light rays passing therethrough relative to the effective optical path of light rays passing through the other of said zonal areas, thereby gradually modifying, in an uninterrupted manner, one of the phase and amplitude characteristics of the light rays transmitted by said complementary zonal area by light rays transmitted by said conjugate zonal area and traveling in overlapping relation therewith toward the conjugate image plane of said objective.

6. An optical system for producing uninterrupted progressively variable phase contrast effects in an image of an object of relatively low contrast and of the type producing deviated and undeviated light rays, said system comprising means providing a light source of predetermined dimensions and contour adjacent an entrance pupil of said system, a condenser and an objective optically aligned with said light source and coacting to provide an image of said light source at an image plane adjacent the exit pupil of said condenser and objective combined, and light-modifying means positioned adjacent said image plane and comprising a pair of individual transparent optical elements, said transparent optical elements respectively having interfitting portions, said optical elements having substantially parallel front and back surface portions spaced predetermined distances apart and jointly providing transversely disposed substantially adjacent transparent zonal areas jointly intercepting substantially all of the deviated and undeviated light rays emanating from an object when positioned at a predetermined object plane of said objective and illuminated by said condenser, said interfitting optical elements being so controlled in optical thicknesses at said zonal areas and so correlated to each other that one of said zonal areas will be a conjugate zonal area for modifying said undeviated light rays and another of said areas will be a complementary zonal area for modifying said deviated light rays, the zonal area constituting the conjugate zonal area being substantially geometrically similar in shape to the shape of said light source image adjacent said exit pupil and of such a size and so located as to intercept substantially all of the undeviated light rays forming said light source image, one of said optical elements being angularly adjustable relative to the other of said elements and with respect to the optical axis of said system to selectively alter the effective optical path at one of said conjugate and complementary zonal areas to light rays passing therethrough relative to the effective optical path of the light rays passing through the other of said zonal areas, thereby gradually modifying, in an uninterrupted manner, one of the phase and amplitude characteristics of the light rays transmitted by said complementary zonal area by light rays transmitted by said conjugate zonal area and traveling in overlapping relation therewith toward the conjugate image plane of said objective.

PHILIP BOONE.

References Cited in the file of this patent
UNITED STATES PATENTS

| Number | Name | Date |
|---|---|---|
| 1,508,585 | Wild | Sept. 16, 1924 |
| 2,427,689 | Osterberg et al. | Sept. 23, 1947 |
| 2,516,905 | Osterberg et al. | Aug. 1, 1950 |

OTHER REFERENCES

Journal of the Optical Society of America, "Reflection and Transmission Interference Filters," by Hadley et al., vol. 37, June 1947; pages 451–465; publ. by American Institute of Physics, New York. Copy in Division 7.